United States Patent [19]
Medlin et al.

[11] Patent Number: 6,073,586
[45] Date of Patent: Jun. 13, 2000

[54] EVAPORATIVE COOLING SYSTEM AND METHOD OF COOLING A POULTRY HOUSE

[75] Inventors: Tony D. Medlin, Wingate, N.C.; Hugh Wilkins, Fairmount, Ga.

[73] Assignee: EPS Systems, Inc., Marshville, N.C.

[21] Appl. No.: 08/924,563

[22] Filed: Sep. 5, 1997

Related U.S. Application Data

[60] Provisional application No. 60/025,583, Sep. 6, 1996, and provisional application No. 60/044,044, Apr. 21, 1997.

[51] Int. Cl.[7] .................................................. A01K 1/00
[52] U.S. Cl. .......................................... 119/437; 119/436
[58] Field of Search .................................. 119/436, 437; 454/239, 233; 236/49.3

[56] References Cited

U.S. PATENT DOCUMENTS

| | | | |
|---|---|---|---|
| 4,462,334 | 7/1984 | Kim | 119/16 |
| 4,476,809 | 10/1984 | Bunger | 119/16 |
| 4,493,289 | 1/1985 | Saurenman | 119/21 |
| 5,136,980 | 8/1992 | Schoeber et al. | 119/16 |
| 5,492,082 | 2/1996 | Krevinghaus et al. | 119/21 |

*Primary Examiner*—Thomas Price
*Attorney, Agent, or Firm*—Christopher C. Dremann, PC; Christopher C. Dremann

[57] ABSTRACT

An evaporative cooling system and a method of cooling a poultry house includes at least one evaporative cooling pad, a bracket extruded from a lightweight, plastic or galvanized steel for supporting the evaporative cooling pad adjacent an opening formed in the sidewall of the poultry house, and an improved device for wetting the evaporative cooling pad. The bracket includes a base, an attachment leg depending from one side of the base, and a pair of retaining legs spaced sufficiently from the attachment leg and depending from the one side of the base. The retaining legs are spaced sufficiently from the attachment leg to permit a ventilation curtain mounted to the sidewall of the poultry house to be raised and lowered without interference from the bracket and the evaporative cooling pads. The evaporative cooling system further includes an automatic control apparatus including a programmable logic controller (PLC), a timer, and a solenoid. A humidistat is located remotely from the evaporative cooling pads in communication with the ambient air outside the poultry house, and is electrically coupled to the PLC. A supply of liquid, such as water, is in fluid communication with the solenoid so that when the solenoid is open, the water is delivered to the wetting apparatus. In a preferred embodiment, the wetting apparatus is a conventional soak hose, and the PLC is programmed to open the solenoid for a predetermined interval of time each minute in response to an electrical output signal from the humidistat which is in proportion to the relative humidity of the ambient air outside the poultry house.

10 Claims, 5 Drawing Sheets

EVAPORATIVE COOLING SYSTEM AND METHOD OF COOLING A POULTRY HOUSE

RELATED APPLICATIONS

This application claims the benefit of U.S. Provisional Application No. 60/025,583 filed Sep. 6, 1996, and U.S. Provisional Application No. 60/044,044 filed Apr. 21, 1997.

FIELD OF THE INVENTION

The invention relates to an evaporative cooling system and a method of cooling a poultry house. More particularly, the invention relates to a bracket for mounting an evaporative cooling pad, an improved means for wetting the evaporative cooling pad, and a means and method for controlling the operation of the evaporative cooling system.

BACKGROUND OF THE INVENTION

Poultry houses must be ventilated and cooled to prevent the mortality of the poultry when the sum of the ambient temperature and the relative humidity inside the poultry house exceeds a known value. It is generally accepted that when the sum of the ambient temperature, measured in degrees Fahrenheit, and the relative humidity exceeds about 180, the poultry can easily suffer mortality. Most poultry farmers agree that it is necessary to reduce the ambient temperature inside the poultry house when the sum of the temperature and the relative humidity exceeds about 160. To this end, it is desirable to maintain the ambient temperature inside the poultry house at or below about 82 degrees Fahrenheit.

A common ventilation system for ventilating and cooling a poultry house includes an extended opening formed in at least one of the sidewalls of the poultry house, and one or more large exhaust fans positioned in a smaller opening formed in one of the sidewalls adjacent an endwall, or formed in the endwall itself. A curtain is secured to the exterior surface of the sidewall, and may be raised as necessary in response to the ambient temperature and the relative humidity to ventilate and cool the inside of the poultry house. The fan exhausts the hot air inside the poultry house and draws fresh air from outside the poultry house through the extended opening formed in the sidewall to replace the air that is exhausted. In many climates, the ambient temperature of the air outside the poultry house is too high during at Least a portion of the calendar year to cool the poultry house to 82 degrees Fahrenheit or below.

Figure 1A:
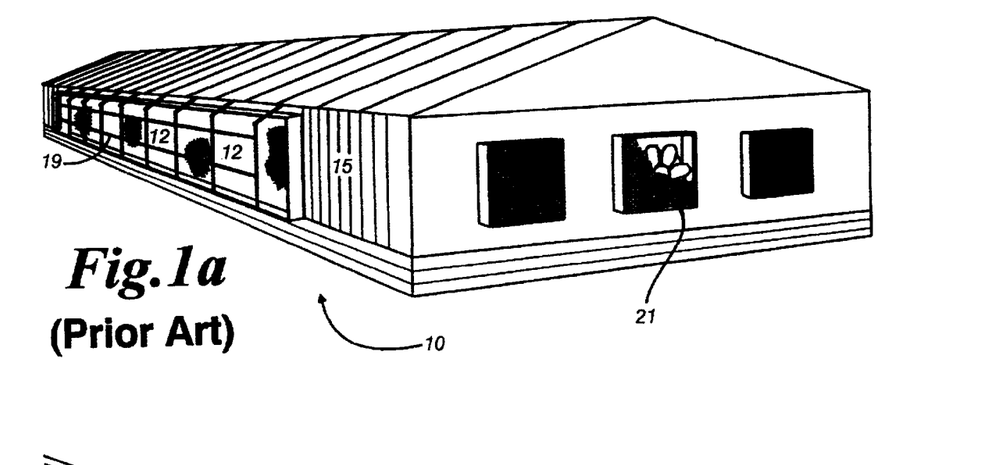
FIG. 1a is a perspective view of a poultry house equipped with a known evaporative cooling system including spray nozzles for wetting a plurality of evaporative cooling pads.
Figure 1B:
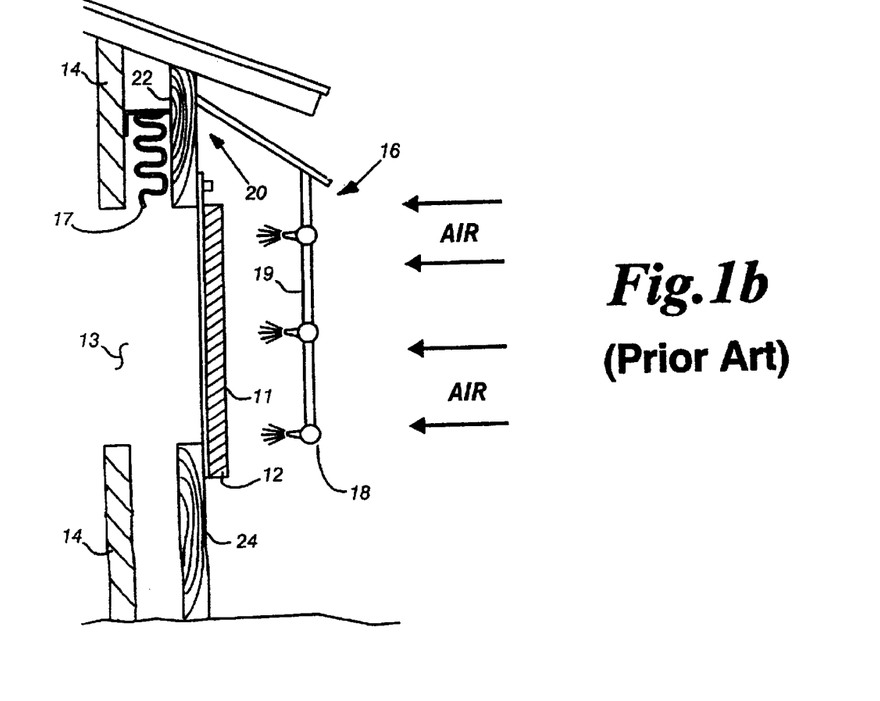
FIG. 1b is a partial sectional view of the evaporative cooling system of FIG. 1a illustrating a known mounting structure for supporting the evaporative cooling pads adjacent the sidewall of the poultry house.

Accordingly, as shown if FIGS. 1a and 1b, many ventilation systems are equipped with an evaporative cooling system positioned adjacent the extended opening formed in the sidewall. Typically, the evaporative cooling system 10 includes at least one fan 21, at least one evaporative cooling pad 12 mounted adjacent the extended opening 13 formed in the sidewall 14, and a means 16 for wetting the evaporative cooling pad with a liquid, such as water, so that the air drawn into the poultry house through the opening 13 is cooled below the ambient temperature of the air outside the poultry house. The evaporative cooling pad 12 is typically made of an absorbent material, such as cellulose, and may be wetted by a recirculated liquid. Typically, however, the evaporative cooling pad 12 is wetted by a plurality of spray nozzles 18 positioned on a framework 19 supported adjacent the sidewall 14 and directed onto the evaporative cooling pad 12.

The spray nozzles 18 emit a fine mist of water onto the exterior surface 11 of the evaporative cooling pad 12 for a predetermined interval of time according to a cycle command from a conventional timer (not shown). The cycle commend opens, and later closes, a solenoid (not shown) which is in fluid, communication with the spray nozzles 18 and a supply of water. To produce the fine mist, the spray nozzles are required to have a very small diameter. Thus, they can easily become clogged by foreign particulate matter present in the water supply. Further, the mist emitted from the spray nozzles 18 is susceptible to wind drift. Accordingly, a substantial amount of the water is lost before it reaches the evaporative cooling pad 12, and portions of the pad may be saturated with water while other portions of the pad are not wetted at all.

Because the amount of water that is delivered to the spray nozzles 18 is determined by the amount of time that the cycle command from the timer opens the solenoid, the amount of water emitted by the spray nozzles 18 is independent of the ambient temperature and the relative humidity of the air outside the poultry house. As a result, the evaporative cooling pad 12 may be wetted by the spray nozzles 18 even when the :relative humidity of the air outside the poultry house is extremely high. Thus, the pad will be saturated and the excess water will run-off onto the ground surrounding the poultry house. Conversely, when the relative humidity of the air outside the poultry house is extremely low, the evaporative cooling pad 12 may not be sufficiently wetted to reduce the temperature of the air drawn into the poultry house to below 82 degrees Fahrenheit.

When wetted, the evaporative cooling pad 12 is substantially heavier than when it is dry, thus the pad must be securely mounted to the superstructure of the poultry house. In addition, the evaporative cooling pad 12 must be spaced from the sidewall 14 of the poultry house sufficiently to permit the ventilation curtain 17 to be raised and lowered without interference from the pad and the mounting structure which supports the pad. A typical mounting structure 20 for securing the evaporative cooling pad 12 to the poultry house is shown in FIG. 1b. A pair of vertical joists 22, 24 are spaced outwardly from the sidewall of the poultry house beyond the ventilation curtain above and below the evaporative cooling pad 12. The pad 12 is secured along its length to the upper joist 22 by conventional fasteners and held in place against the lower joist 24 by a cable tightened by a turnbuckle (not shown). Accordingly, the fasteners and cable of the mounting structure 20 must be completely disassembled to remove and replace a damaged pad 12.

As should be apparent from the above limitations of known ventilation and evaporative cooling systems, a need exists in the poultry industry for a bracket for mounting an evaporative cooling pad, for an improved means for wetting the evaporative cooling pad, and for a means and method for controlling the operation of the evaporative cooling system. Accordingly, it is an object of the invention to provide a method of cooling a poultry house which does not require the use of spray nozzles which may become clogged, which may unevenly wet the pad, and which produce a fine mist that is susceptible to wind drift.

It is another object of the invention to provide a method of cooling a poultry house wherein the amount of water delivered to the evaporative cooling pad is dependent on the ambient temperature and the relative humidity of the air outside the poultry house.

It is another object of the invention to provide a method of cooling a poultry house which automatically controls the amount of water which is delivered to the evaporative cooling pad.

It is another object of the invention to provide a bracket for mounting an evaporative cooling pad which spaces the pad sufficiently from the sidewall of the poultry house to permit the ventilation curtain to be raised and lowered without interference from the bracket or the evaporative cooling pad.

It is another object of the invention to provide a bracket for mounting an evaporative cooling pad which is sufficiently strong to support a thoroughly wetted evaporative cooling pad.

It is another object of the invention to provide a bracket for mounting an evaporative cooling pad which permits a damaged pad to be removed and replaced without completely disassembling the mounting structure.

SUMMARY OF THE INVENTION

The invention is an evaporative cooling system and a method of cooling a poultry house. More particularly, the invention is a bracket for mounting an evaporative cooling pad, an improved means for wetting the evaporative cooling pad, and a means and method for controlling the operation of the evaporative cooling system.

In one embodiment, the mounting bracket is made of a rigid material, such as hard plastic or heavy gage galvanized steel, having a sufficient modulus of torsional rigidity over its entire length to avoid warping in extreme ambient conditions. Preferably, the bracket includes an outer bracket section, and an inner bracket section that is securely fastened to the outer bracket section. The outer bracket section is generally U-shaped and includes an elongate, generally planar base, an attachment leg depending perpendicularly from one side of the base, and an outer z-shaped retaining leg spaced outwardly a predetermined distance from the attachment leg and depending substantially perpendicularly from the one side of the base. The attachment leg has a plurality of openings formed therethrough for receiving a corresponding plurality of fasteners therein to secure the mounting bracket to the exterior surface of the sidewall of the poultry house.

The inner bracket section is securely fastened to the outer bracket section at a predetermined distance between the attachment leg and the outer retaining leg, and comprises an inner z-shaped retaining leg. Together, the outer z-shaped retaining leg and the inner z-shaped retaining leg define a narrower portion adjacent the base of the outer bracket section and a wider portion spaced from the base in which the inner and outer retaining legs are sufficiently spaced apart to receive an edge Of an evaporative cooling pad therebetween.

In another embodiment, the mounting bracket is extruded from a lightweight, flexible and resilient plastic material, such as polyurethane, polyethylene or polyvinylchloride (PVC). The bracket includes an elongate, generally planar base, an attachment leg depending perpendicularly from one side of the base, and a pair of parallel retaining legs spaced outwardly a predetermined distance from the attachment leg and depending perpendicularly from the one side of the base. The attachment leg has a plurality of openings formed therethrough for receiving a corresponding plurality of fasteners therein to secure the mounting bracket to the exterior surface of the sidewall of the poultry house. The retaining legs are sufficiently spaced apart to receive an edge of an evaporative cooling pad therebetween.

Regardless of which embodiment of the mounting bracket is utilized, a predetermined length of the mounting bracket is secured to the exterior surface of the sidewall of the poultry house adjacent the upper, lower, and side edges of the ventilation opening with the attachment legs of the mounting brackets oriented in the direction of the opening. The edges of the desired number of evaporative cooling pads are positioned within the retaining legs, and the ends of the mounting brackets are joined so that the upper, lower, and side mounting brackets form a closed frame encircling the free edges of the evaporative cooling pads.

The improved means for wetting the evaporative cooling pads comprises a predetermined length of an elongate, rigid, hollow pipe having a pair of opposed ends and a plurality of spaced apart drain holes therethrough along the length of the pipe. One of the opposed ends of the pipe is in fluid communication with a supply of liquid, such as water, and the other opposed end is closed off. The rigid pipe is positioned so that the liquid flows vertically downward out the drain holes formed in the pipe and is delivered to the upper edges of the evaporative cooling pads.

The means for controlling the operation of the evaporative cooling system comprises a controller which is in fluid communication with the means for wetting the evaporative cooling pad and with a supply of water. The controller is also electrically coupled to a humidistat which is located remotely from the evaporative cooling system in communication with the air outside the poultry house. The controller preferably comprises a programmable logic controller (PLC), a timer, and a solenoid. The PLC is electrically coupled to a power source, the humidistat, the timer and the solenoid. The timer is electrically coupled to the PLC and the solenoid. In turn, the solenoid is in fluid communication with the wetting means and with the supply of water.

The method for controlling the operation of the evaporative cooling system includes measuring the relative humidity of the ambient air outside the poultry house and producing an electrical output signal in proportion to the relative humidity indicated by the humidistat. When the controller is powered, the humidistat supplies a continuous electrical output signal proportional to the relative humidity of the ambient air outside the poultry house to the controller for processing by the PLC. When the relative humidity falls below a predetermined value, the PLC produces an electrical signal in response to the electrical output signal from the humidistat which is provided to the solenoid to continuously wet the evaporative cooling pad, or to the timer to wet the pad for a predetermined interval of time. The solenoid remains open until the PLC sends a second electrical signal to close the solenoid in response to a liquid sensitive contact switch located adjacent the base of the evaporative cooling pad, or in response to an indication from the electrical output signal from the humidistat that the relative humidity exceeds the predetermined value. In an alternative embodiment, the solenoid remains open until the PLC sends a second electrical signal to close the solenoid in response to the timer.

BRIEF DESCRIPTION OF THE DRAWINGS

While some of the objects and advantages of the invention have been stated, others will become apparent as preferred embodiments of the invention are described in connection with the accompanying drawings in which.

DETAILED DESCRIPTION OF THE PREFERRED EMBODIMENTS

Referring now to the accompanying drawings, in which like reference numerals indicate like parts, FIGS. 2–6 describe an evaporative cooling system and a method of cooling a poultry house according to the invention. Specifically, FIG. 2a is a perspective view of the evaporative cooling system, indicated generally at 30, secured to the exterior surface 15 of the sidewall 14 (FIG. 2b) of a poultry house. As best shown in FIG. 2b, an extended opening 13 is formed in the sidewall 14 to permit fresh air from outside the poultry house to be drawn into the poultry house by a large fan 21 which is preferably located in a smaller opening formed in one of the sidewalls adjacent an endwall, or formed in the endwall of the poultry house itself. The evaporative cooling system 30 comprises at least one evaporative cooling pad 32, a bracket 34 for mounting the evaporative cooling pad to the sidewall 14 of the poultry house, and wetting means 40 for wetting the evaporative cooling pad.

Figure 2A:
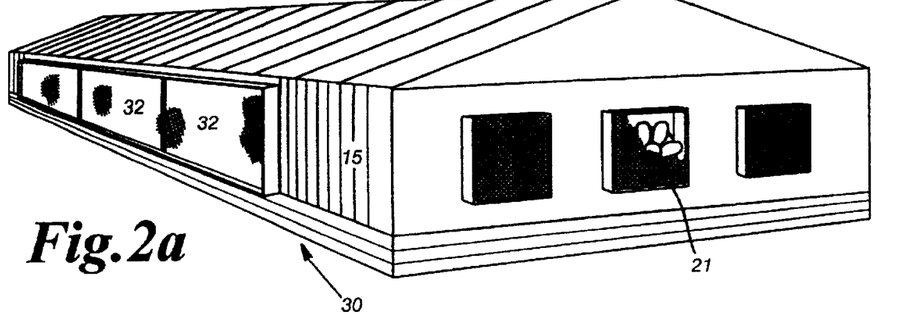
FIG. 2a is a perspective view of a poultry house equipped with an evaporative cooling system according to the invention.
Figure 2B:
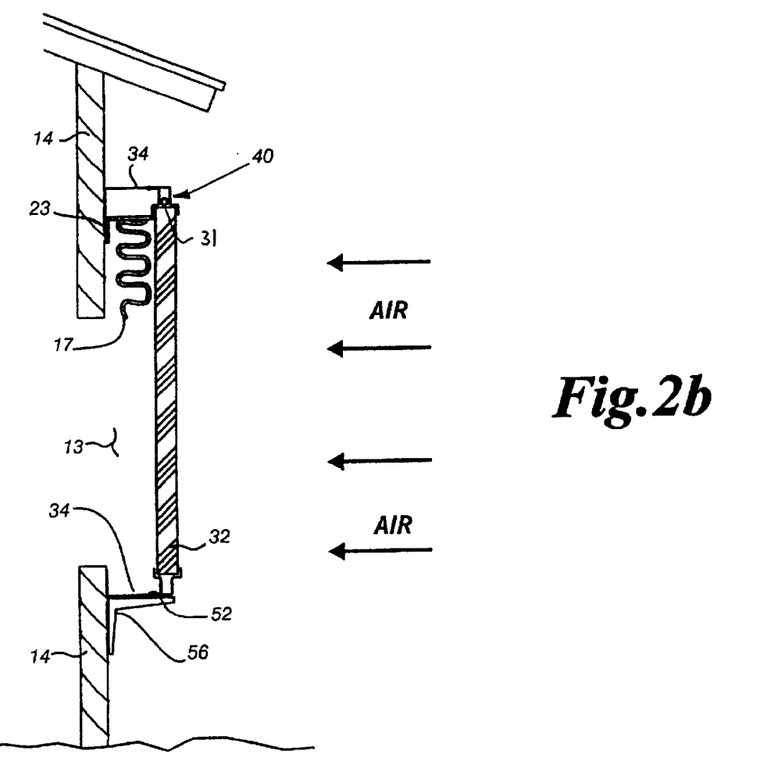
FIG. 2b is a partial sectional view of the evaporative cooling system of FIG. 2a illustrating a mounting bracket and an improved wetting means according to a preferred embodiment of the invention.

The evaporative cooling pad 32 is made of an absorbent, porous material which absorbs a liquid, such as water, while permitting air to flow through the pad in the direction indicated by the arrows in FIG. 2b. Preferably, the evaporative cooling pad 32 is made of a cellulose material, such as corrugated paper. Such evaporative cooling pads are well known and form no part of the present invention. A suitable pad is available from the Munters Incentive Group of Fort Myers, Florida and is sold under the trademark MI-T-FOG™. The evaporative cooling pad 32 is manufactured in thicknesses of up to about six inches, but is preferably about two inches thick. The pad is available in convenient widths and heights, or may be cut to any desired shape and size. Typically, however, the area of the evaporative cooling pad 32 is sized to slightly overlap the opening 13 formed in the sidewall 14 of the poultry house.

Figure 3A:
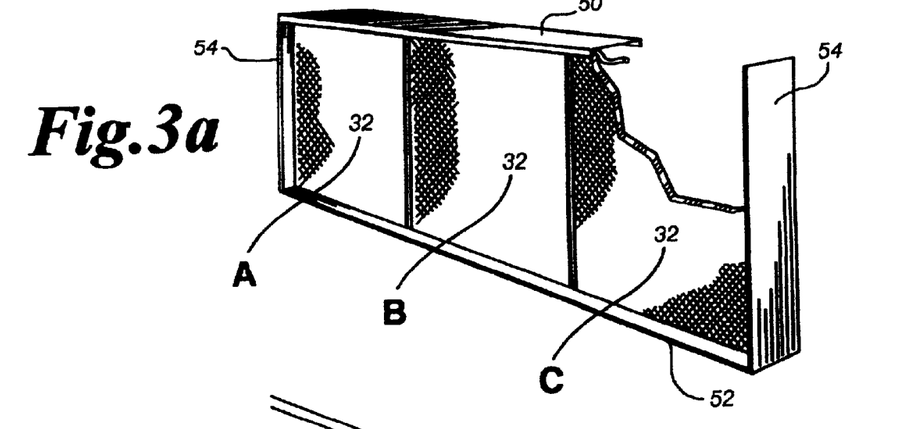
FIG. 3a is a perspective view of a plurality of evaporative cooling pads supported along their free edges by a plurality of mounting brackets according to the invention.

As shown in FIG. 2b, the bracket 34 mounts the evaporative cooling pad 32 in a generally vertical orientation and spaces the evaporative cooling pad 32 at a sufficient distance from the sidewall 14 of the poultry house to permit a ventilation curtain 17 to be raised and lowered without interference from the pad 32 or the bracket 34. As best shown in FIG. 3a, a top bracket 50, a bottom bracket 52, and a pair of side brackets 54 are preferably utilized to form a continuous, substantially airtight frame around the evaporative cooling pad 32. In a typical installation, however, a plurality of evaporative cooling pads 32, such as A, B, and C as shown, are positioned adjacent to one another to completely cover, and to slightly overlap (as previously mentioned) the opening 13 formed in the sidewall 14 of the poultry house. Preferably, the ventilation curtain 17 is attached to a separate curtain bracket 23 which is fixed to the sidewall 14 of the poultry house by a plurality of fasteners (not shown). However, the ventilation curtain 17 may also be secured to the underside of the top bracket 50.

Figure 6:
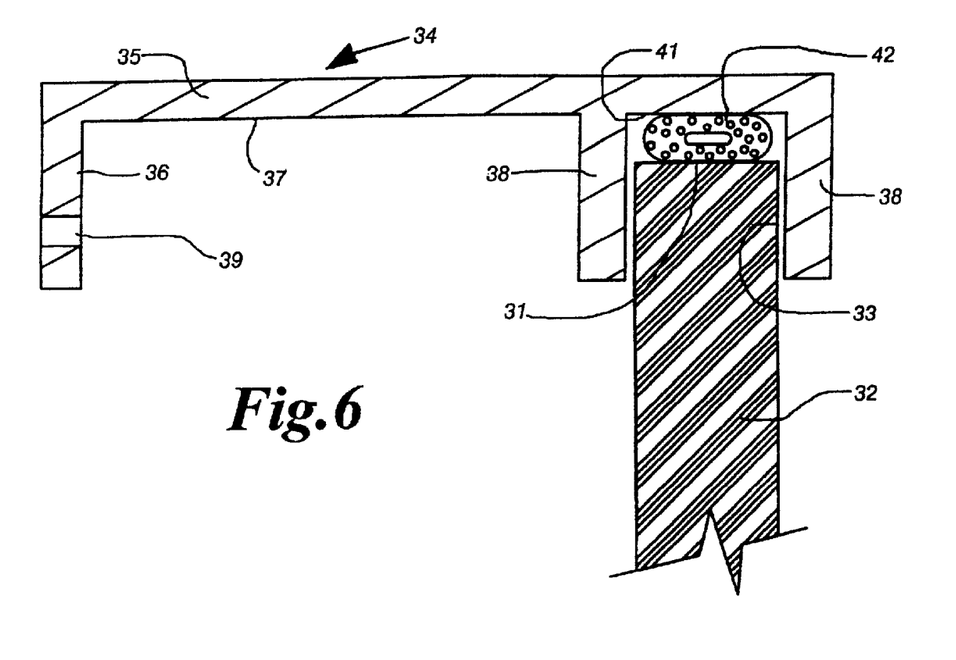
FIG. 6 is a cross-sectional view of an alternative embodiment of a mounting bracket and an improved wetting means according to the invention.

The mounting bracket 34 is preferably made from a material that is selected and formed in a manner such that the mounting bracket provides sufficient torsional rigidity over its entire length, yet is flexible enough to permit the evaporative cooling pad 32 to be removed and replaced without completely disassembling the bracket 34 from the poultry house. Accordingly, bracket 34 may be extruded from a lightweight, yet durable and strong, plastic material which is resistant to ultraviolet radiation, such as polyurethane, polyethylene, polypropylene or polyvinylchloride (PVC). Such a bracket 34 is shown in FIG. 6 and described in detail hereinafter. The lightweight, extruded bracket 34 is preferably stiff enough to retain the evaporative cooling pad 32 even when the cooling pad is thoroughly wetted (and thus substantially heavier), but is flexible enough to permit, for example, the top bracket 50 to be bent upwards as indicated by the dashed lines in FIG. 3b to install the evaporative cooling pad 32 or to remove and replace a damaged pad without disassembling the entire frame consisting of the top 50, bottom 52 and side 54 brackets (FIG. 3a).

Figure 3B:
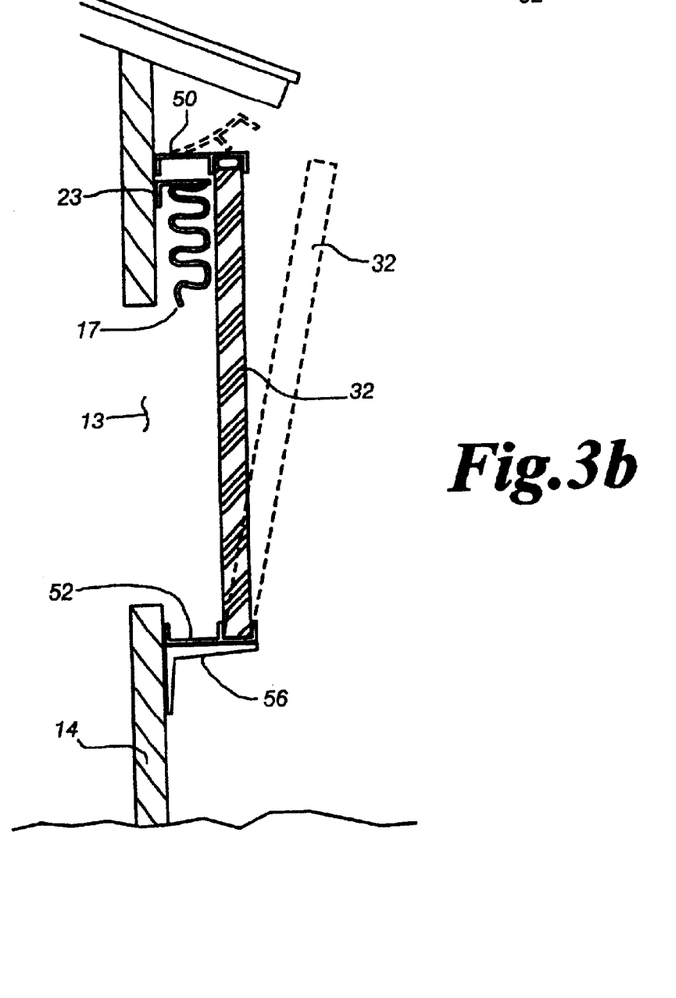
FIG. 3b is a partial sectional view of an evaporative cooling system according to the invention illustrating the removal and replacement of a damaged evaporative cooling pad.

As best shown in FIG. 2b and FIG. 3b, the bottom bracket 52 (which carries the weight of the evaporative cooling pads 32) may be supported by a plurality of L-shaped shelf brackets 56 spaced apart at predetermined intervals along the length of the bottom bracket 52. The bottom bracket 52 may also be extruded into a thicker cross-section to increase its lengthwise bending strength, and thus eliminate the need for the shelf brackets 56. However, it is preferred that the thickness of the bottom bracket 52 be the same as the thickness of the top 50 and side 54 brackets to reduce tooling costs, and so that the top, bottom and side brackets are interchangeable. A preferred method of installing a plurality of evaporative cooling pads 32 to the sidewall 14 of a poultry house using interchangeable top 50, bottom 52 and side 54 brackets is described in detail in the EPS™ SYSTEM INSTRUCTION MANUAL, © 1996 by EPS Systems, Inc.

In the course of development and testing, it has been determined that a thin, elongate, extruded PVC upper mounting bracket has a tendency to warp and deform torsionally when exposed to large temperature changes in the ambient environment. Further, it has been discovered that the MICRO-MIST® soaker hose described hereinafter for wetting the evaporative cooling pads can shift position within the parallel retaining legs of the bracket, and thus, is not always maintained centrally above the evaporative cooling pads. Accordingly, the preferred embodiment of the mounting bracket described immediately hereinafter provides improved torsional rigidity and includes means for maintaining the MICRO-MIST® soaker hose centrally positioned above the evaporative cooling pads.

Figure 4:
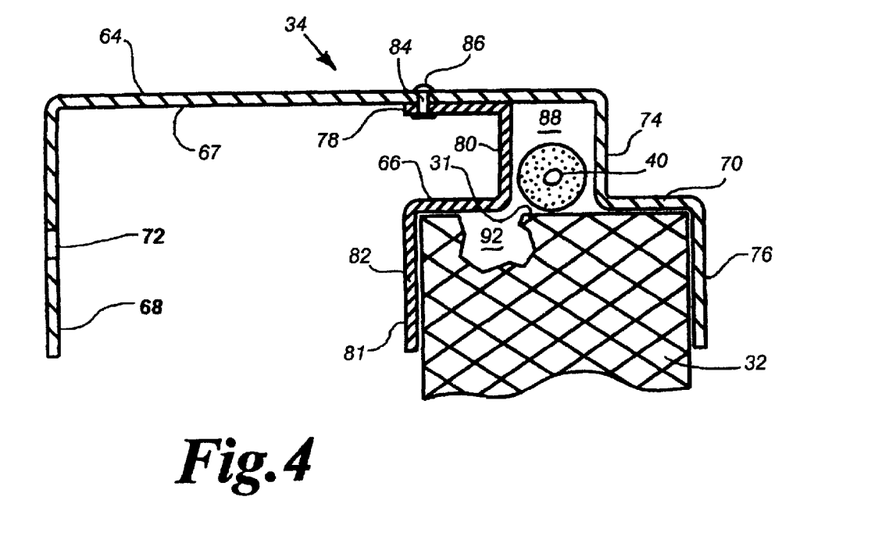
FIG. 4 is a cross-sectional view of a mounting bracket and an improved wetting means according to the preferred embodiment of the invention shown in FIG. 2b.

FIG. 4 is a cross-sectional view of a mounting bracket 34 and an improved wetting means 40 according to a preferred embodiment of the invention. The upper mounting bracket 34 is preferably made of relatively heavy gage galvanized steel, such as 20 gage, and is comprised of an outer bracket section 64 and an inner bracket section 66 that is securely fastened to the outer bracket section. The inner bracket section 66 is secured to the outer bracket section 64 by a suitable fastener 86, for example, a button-head rivet or a machine screw which cooperates with a threaded through-hole provided in the inner bracket section. However, as described hereinabove, the mounting bracket 34 may also be extruded from a thick rigid plastic that has a modulus of torsional rigidity over its entire length which is sufficient to prevent warping when exposed to large temperature changes in the ambient environment.

As best shown in FIG. 4, outer bracket section 64 is formed in a generally U-shape comprising a base 67, an attachment leg 68 and a z-shaped outer retaining leg 70. A plurality of holes 72 are provided along the length of the attachment leg 68 which receive fasteners (not shown) therein for securing the mounting bracket 34 to the exterior surface 15 of the sidewall 14 of the poultry house. The inner bracket section 66 comprises an attachment flange 78 and a z-shaped inner retaining leg 81. A plurality of holes 84 are provided along the length of the attachment flange 78 and the base 67 of the outer bracket section 64. The holes 84 receive the fasteners 86 therein to secure the inner bracket section 66 to the outer bracket section 64 along its entire length.

Together, a first narrow portion 74 of the outer retaining leg 70 of the outer bracket section 64 and a second narrow portion 80 of the inner retaining leg 81 of the inner bracket section 66 define a first elongate channel 88 for retaining the wetting means 40 therein. Likewise, a first wide portion 76 of the outer retaining leg 70 of the outer bracket section 64 and a second wide portion 82 of the inner retaining leg 81 of the inner bracket section 66 define a second elongate channel 92 for retaining the upper edge 31 of the evaporative cooling pad 32. Accordingly, each of the top 50, bottom 52 and side 54 mounting brackets retain the evaporative cooling pads 32 between the first and second wide portions 76, 82, and the top 50 mounting bracket retains the wetting means 40 between the first and second narrow portions 74, 80. Thus, the wetting means 40 is maintained centrally positioned above the evaporative cooling pads 32.

FIG. 6 is a cross-sectional view of an alternative embodiment of a mounting bracket and an improved wetting means according to the invention. The bracket 34 comprises an elongate base 35 having an attachment leg 36 depending from one side 37 of the base, and a pair of parallel retaining legs 38 spaced a predetermined distance from the attachment leg 36 and depending perpendicularly from the one side 37 of the base 35. The attachment leg 36 has a plurality of spaced apart holes 39 formed therethrough at predetermined intervals along its length. The holes 39 receive fasteners (not shown) therein for securing the attachment leg 36 of the bracket 34 to the exterior surface 15 of the sidewall 14 of the poultry house. The pair of retaining legs 38 are spaced from the attachment leg 36 sufficiently to permit the ventilation curtain 17 to be raised and lowered to expose and cover, respectively, the opening 13 in the sidewall 14 of the poultry house without interference from the bracket 34 or the evaporative cooling pads 32. Accordingly, the top bracket 50 is secured to the sidewall 14 of the poultry house at an elevation above the elevation of the L-shaped mounting bracket 23 of the ventilation curtain 17, and the bottom bracket 52 is secured to the sidewall 14 of the poultry house at an elevation below the lowest elevation that the ventilation curtain 17 reaches when lowered.

The wetting means 40 may be any means for delivering a liquid, such as water, to the upper edge 31 of the evaporative cooling pad 32. For example, wetting means 40 may be a predetermined length of an elongate, rigid, hollow pipe having a pair of opposed ends and a plurality of spaced apart drain holes therethrough along the length of the pipe. One of the opposed ends of the pipe is in fluid communication with a supply of water, and the other opposed end is closed off. Thus, the water flows out the drain holes formed in the pipe vertically downward under the influence of gravity and through the evaporative cooling pad 32. Preferably, however, the wetting means 40 is a predetermined length of an elongate, flexible hose made of a porous material, such as foam rubber, or soft polyvinylchloride (PVC). A suitable hose is a conventional "soaker" hose 42 (FIG. 6) available from any building materials or garden supply retailer. More preferably, the wetting means 40 is a MICRO-MIST™ soaker hose.

As is now apparent, the mounting brackets 34 provide improved torsional rigidity and maintain the MICRO-MIST™ soaker hose 42 centrally positioned above the evaporative cooling pads 32 of the evaporative cooling system 30. Thus, the evaporative cooling pads 32 are retained securely along the entire length of the mounting brackets 34 and the MICRO-MIST™ soaker hose 42 distributes water evenly across the entire thickness of the evaporative cooling pads 32.

It should be noted in FIG. 6 that wetting means 40 is positioned between the upper edge 31 of the evaporative cooling pad 32 and the inner surface 41 of the base 35 of top bracket 50, and between the pair of retaining legs 38. Preferably, the soaker hose 42 is compressed, as shown, to increase the surface area of the porous hose across the upper edge 31 of the evaporative cooling pad 32 and to help maintain the hose centrally positioned over the evaporative cooling pad. The hose 42 may be secured to the inner surface 41 of the top bracket 50 by conventional retaining clips, or may be held tightly between top bracket 50 and the evaporative cooling pad 32 without the use of mechanical fasteners.

Figure 5:
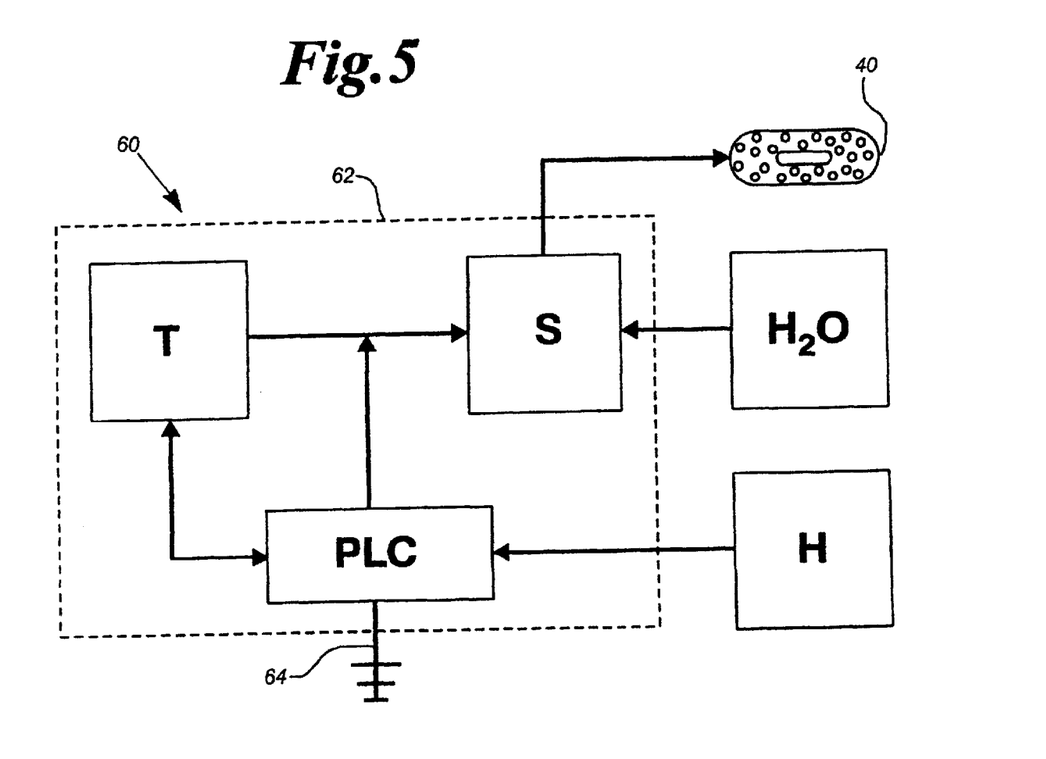
FIG. 5 is a schematic diagram illustrating the components of a means for controlling an evaporative cooling system according to the invention.

A preferred embodiment of a means and method for controlling the operation of an evaporative cooling system according to the invention is illustrated schematically in FIG. 5. The evaporative cooling system 30 further comprises control means 60 for automatically controlling the amount of liquid, e.g. water, that is delivered to the evaporative cooling pads 32. Control means 60 comprises a controller 62 which is in fluid communication with wetting means 40 and with a supply of water $H_2O$. Controller 62 is also electrically coupled to a humidistat H which is located remotely from the evaporative cooling system 30 and in communication with the air outside the poultry house. The controller 62 may be located anywhere relative to the mounting brackets 34 and the evaporative cooling pads 32, but preferably is conveniently located near the evaporative cooling system 30, such as on the interior of the sidewall 14 of the poultry house.

The controller 62 preferably comprises a programmable logic controller PLC, a timer T, and a solenoid S. The PLC is electrically coupled to a power source 64, the humidistat H, the timer T and the solenoid S. The timer T is electrically coupled to the solenoid S and to the PLC. The solenoid S is in fluid communication with the wetting means 40 and with the supply of water $H_2O$.

As previously mentioned, humidistat H is located remotely from the evaporative cooling system 30 and in communication with the ambient air outside the poultry house. Accordingly, the relative humidity measured by the humidistat H is not influenced by the water on, or around, the evaporative cooling pads 32. The humidistat H may be any device for measuring the relative humidity of ambient air and for producing an electrical output signal in proportion to the measured relative humidity. Preferably, however, the humidistat H is a Model No. RH+T Sensor 03 manufactured by PROTECH, INC. of Statesville, N.C. When the controller 62 is powered, the humidistat H supplies a continuous electrical output signal that is proportional to the relative humidity of the ambient air outside the poultry house to the controller for processing by the PLC. The PLC produces a first electrical signal in response to the electrical output signal from the humidistat H, and provides the first electrical signal to open the solenoid S to continuously wet the evaporative cooling pads 32, or to the timer T to wet the pads 32 for a predetermined interval of time per minute of elapsed time.

It is desired to continuously wet the evaporative cooling pads 32 when the relative humidity of the ambient air outside the poultry house (i.e., the electrical output signal from the humidistat H) falls below a predetermined value. In response to the electrical output signal from the humidistat H, a first electrical signal is provided from the PLC to the solenoid S to open the solenoid and thus permit water to flow from the supply of water $H_2O$ to the wetting means 40. The wetting means 40 may be any means for wetting the evaporative cooling pads 32, including the previously described nozzles 18 or the rigid pipe having drain holes therein, but most preferably is the soak hose 42. The solenoid S remains open until a second electrical signal is sent from the PLC to the solenoid S to close the solenoid in response to a liquid sensitive contact switch (not shown) located adjacent the base of the evaporative cooling pad 32, or in response to the electrical output signal from the humidistat H exceeding the predetermined value.

In a preferred embodiment, however, a first electrical signal is provided from the PLC to the timer T in response to the electrical output signal from the humidistat H if the relative humidity of the ambient air outside the poultry house falls below a predetermined value. A second electrical signal is provided from the timer T to the solenoid S to open the solenoid for a predetermined interval of time per minute of elapsed time. At the end of the predetermined interval of time, a third electrical signal is provided from the timer T to the solenoid S to close the solenoid S, and a fourth electrical signal is provided from the timer T to the PLC to indicate that the timer is off. When the timer indicates to the PLC that the timer is off, the PLC is ready to again receive the electrical output signal from the humidistat H. The predetermined value of the relative humidity and the predetermined interval of time may be selected by the operator and programmed into the PLC.

For example, the PLC may be programmed to turn the solenoid S and the timer T off between the hours of 9:00 pm and 9:00 am when the ambient temperature of the air outside the poultry house is typically below 82 degrees Fahrenheit. This period may be used to dry the evaporative cooling pads 32 to extend the life of the pads and to prevent the growth of algae on the pads. As the ambient temperature of the air outside the poultry house rises during the daylight hours, and the temperature of the air inside the poultry house exceeds 82 degrees Fahrenheit, the PLC monitors the electrical output signal from the humidistat H. If the relative humidity of the air outside the poultry house remains greater than about 80 percent, the evaporative cooling pads 32 do not need to be wetted because there is sufficient water vapor in the ambient air to wet the pads.

However, if the relative humidity of the air outside the poultry house is between about 70 percent and about 80 percent, the PLC may provide a first electrical signal to the timer T to produce and provide a second electrical signal to open the solenoid S for approximately twenty seconds each minute. It has been determined empirically that this interval of time per minute of elapsed time is adequate to wet the evaporative cooling pads 32 sufficiently to maintain the ambient temperature inside the poultry house at or below about 82 degrees Fahrenheit. If the relative humidity of the air outside the poultry house is between about 60 percent and about 70 percent, the PLC may provide a first electrical signal to the timer T to produce and provide a second electrical signal to open the solenoid S for approximately twenty-five seconds each minute. It has been determined empirically that this interval of time is adequate to wet the evaporative cooling pads 32 sufficiently to maintain the ambient temperature inside the poultry house at or below about 82 degrees Fahrenheit. If the relative humidity of the air outside the poultry house falls below about 60 percent, the PLC provides a first electrical signal to the timer T to produce and provide a second electrical signal to open the solenoid S for approximately thirty-five seconds each minute. It has been determined empirically that this interval of time is adequate to wet the evaporative cooling pads 32 sufficiently to maintain the ambient temperature inside the poultry house at or below about 82 degrees Fahrenheit.

It is apparent that the evaporative cooling system and the method of cooling a poultry house described herein provides a bracket for mounting a plurality of evaporative cooling pads to the sidewall of a poultry house, an improved means for wetting the evaporative cooling pads and a means and method for automatically maintaining the ambient temperature of the air inside a poultry house at or below about 82 degrees Fahrenheit. It is to be understood that the foregoing description and the specific embodiments shown herein are merely illustrative of the best mode of the invention and the principles thereof, and that various modifications may be made to the system and method by those skilled in the art without departing from the spirit and scope of the invention.

What is claimed is:

1. An apparatus for automatically controlling an evaporative cooling system of a poultry house having a wetting means and a supply of water, the apparatus comprising:

a controller in fluid communication with the wetting means and with the supply of water; and a humidistat in communication with the ambient air outside the poultry house and electrically coupled to said controller.

2. An apparatus for automatically controlling an evaporative cooling system according to claim 1 wherein said humidistat measures the relative humidity of the ambient air outside the poultry house and produces an electrical output signal in proportion to the measured relative humidity.

3. An apparatus for automatically controlling an evaporative cooling system according to claim 1 wherein said controller comprises:

a programmable logic controller (PLC) electrically coupled to a power source;

a timer electrically coupled to said PLC; and a solenoid electrically coupled to said PLC and to said timer and in fluid communication with the wetting means and the supply of water.

4. A method of controlling an evaporative cooling system having a PLC electronically coupled to a humidistat, a timer and a solenoid, the solenoid in fluid communication with a supply of water and a means for wetting, the method comprising the steps of:

measuring the relative humidity of the ambient air outside a poultry house with the humidistat;

producing a continuous electrical output signal by the humidistat to the PLC in proportion to the relative humidity measured by the humidistat;

producing a first electrical signal by the PLC to the solenoid in response to the electrical output signal from the humidistat;

opening the solenoid to permit water to flow from the supply of water to the means for wetting in response to the first electrical signal from the PLC; and closing the solenoid in response to the continuous electrical output signal from the humidistat measuring the relative humidity of the ambient air outside the poultry house.

5. A method of cooling a poultry house according to claim 4 wherein the step of opening the solenoid comprises the steps of:

providing the first electrical signal from the PLC to the timer in response to the electrical output signal from the humidistat; and sending a second electrical signal from the timer to the solenoid to open the solenoid for a predetermined interval of time per minute of elapsed time.

6. A method of cooling a poultry house according to claim 4 wherein the step of opening the solenoid comprises providing the first electrical signal from the PLC to the solenoid to open the solenoid.

7. A method of cooling a poultry house according to claim 4 wherein the step of closing the solenoid comprises the steps of:

sending a third electrical signal from the timer to the solenoid at the end of the predetermined interval of time to close the solenoid; and sending a fourth electrical signal from the timer to the PLC at the end of the predetermined interval of time.

8. A method of cooling a poultry house according to claim 4 wherein the step of closing the solenoid comprises providing a second electrical signal from the PLC to the solenoid in response to the electrical output signal from the humidistat exceeding a predetermined value to close the solenoid.

9. A method of cooling a poultry house according to claim 4 wherein the step of closing the solenoid comprises providing a second electrical signal from the PLC to the solenoid in response to a liquid sensitive contact switch located adjacent the base of an evaporative cooling pad to close the solenoid.

10. An apparatus for automatically controlling an evaporative cooling system of a poultry house having a wetting means and a supply of water, the apparatus comprising:

a controller in fluid communication with the wetting means and with the supply of water, said controller comprising:

a programmable logic controller (PLC) electrically coupled to a power source;

a timer electrically coupled to said PLC; and a solenoid electrically coupled to said PLC and to said timer and in fluid communication with the wetting means and the supply of water; and a humidistat in communication with the ambient air outside the poultry house and electrically coupled to said controller.

* * * * *